Figure 1:
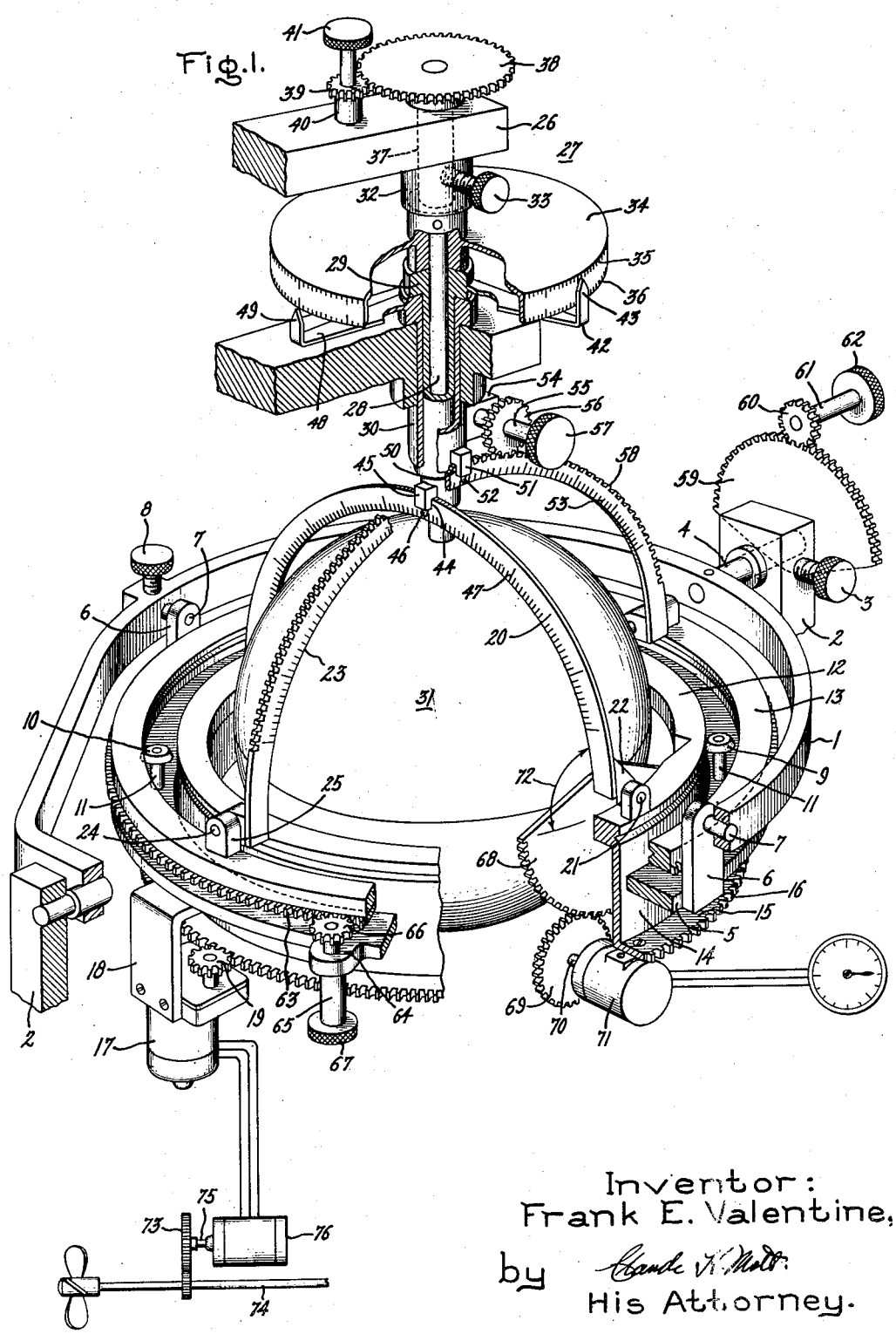

Sept. 16, 1952      F. E. VALENTINE      2,610,403
GREAT CIRCLE COURSE COMPUTER

Filed Dec. 30, 1949      2 SHEETS—SHEET 2

Inventor:
Frank E. Valentine,
by *[signature]*
His Attorney.

Patented Sept. 16, 1952

2,610,403

UNITED STATES PATENT OFFICE 2,610,403

GREAT CIRCLE COURSE COMPUTER

Frank E. Valentine, Schenectady, N. Y., assignor to General Electric Company, a corporation of New York Application December 30, 1949, Serial No. 135,918

3 Claims. (Cl. 33—1)

This invention relates to a great circle course computer and, in particular, to mechanism that indicates at any stage of a course along a great circle route the exact position of a ship and the course angle to be followed by the helmsman or automatic steering equipment.

In the navigation of a ship, it is necessary to take a fix on the sun or stars and to determine by means of celestial navigation the location of a ship at any one instant. The process of obtaining one's dead reckoning point involves the use of mathematical tables and charts. The computation after a fix on the star has been taken, usually requires about 15 minutes. This calculation is frequently repeated and a chart made from the calculations to determine the course of the ship. After each fix, a course angle is then computed which directs the ship's helmsman as to the course to be followed. It is not unusual that an hour's time be required to solve the course angle problem.

In bad weather, of course, it is impossible to determine a position by celestial navigation and it is then necessary to estimate the course and position of the ship. Naturally, this latter method leaves room for considerable error.

While automatic dead reckoning devices that plot courses sailed by ships are not new, there has long been need in the art for an automatic great circle course computer that at all times indicates the course angle to be followed by the helmsman.

It is an object of this invention to provide a new and improved dead reckoning and great circle course-computing device.

It is a further object of this invention to provide an improved dead reckoning device which is practical and yet does not involve excessive cost of construction.

It is a still further object of this invention to provide a new and improved dead reckoning and great circle course computer that is accurate and which functions to lead a ship to its destination in any kind of weather.

Broadly, this invention comprises a gimbal system provided with a pair of semi-circular hoops which represent meridians. The ends of these hoops are secured to rings which describe the great circle course to be followed to a predetermined destination. After the hoops have been set, the hoop that represents the present meridian is movable in response to the revolutions of the ship's propeller to indicate at all times the position of the ship along the preselected great circle course, and the angle to be followed by the helmsman.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Figure 2:
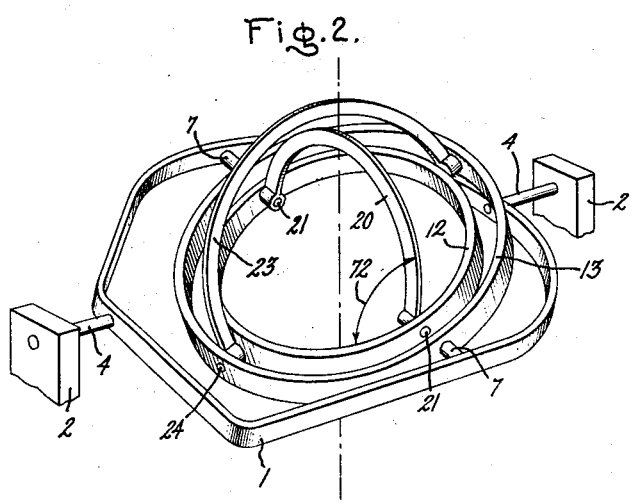

Referring to the drawing, Fig. 1 is a diagrammatic view in perspective showing the functioning elements of this improved computing device; while Fig. 2 is a diagrammatic view indicating the position of the course ring for a pre-selected course.

In the drawing, a D-ring 1 is pivotally supported in a stand 2. A lock screw 3 is positioned in the stand to secure the supporting shaft 4 of the D-ring in any selected position.

A support ring 5 is pivotally secured to D-ring 1 by ears 6 and pins 7 positioned 90 degrees out of line with shafts 4. A locking screw 8 is positioned in D-ring 1 to secure pins 7 in any selected position.

Support ring 5 is provided with a plurality of disposed circumferentially rollers such as 9 and 10 which are suitably spaced and rotatably secured by means of vertical shafts 11. Rollers 9 support an inner ring 12 to be rotatable relative to and in a plane parallel with support ring 5, while rollers 10 support an outer ring 13 so that it is rotatable relative to and in a plane parallel with support ring 5. Rings 12 and 13, then, are rotatable in parallel planes relative to one another and to support ring 5.

Inner ring 12 is provided with an integrally formed circular hoop 14 which extends downwardly from the ring. A ring gear 15, provided with gear teeth 16, is secured to hoop 14. Gear ring 15 extends outwardly from hoop 14 and therefore lies in a plane parallel to ring 12. A motor 17 is supported by a bracket 18 which, in turn, is secured to support ring 5. Motor 17 drives a pinion 19 which is in mesh with gear teeth 16 on gear ring 15.

A semi-circular hoop, hereinafter called the present meridian hoop 20, is pivotally mounted by pins 21 in ears 22 which are secured to inner ring 12. This structure permits the plane of present meridian hoop 20 to be pivotable relative to the plane of inner ring 12.

A second semi-circular hoop 23, similar to hoop 20, is pivotally mounted by means of pins 24 in ears 25 secured to outer ring 13. Hoop 23 will hereinafter be called destination meridian hoop.

For the purpose of clarity, an upwardly extending portion of stand 2 has not been shown, but the stand does continue upwardly to provide a top portion 26 which is an integral part of stand 2. A vertical shaft structure designated generally as 27 is supported from the upper portion 26 of stand 2 and its axis passes through the center of inner ring 12 and outer ring 13.

Vertical shaft structure 27 comprises an inner shaft 28, a central shaft 29 and an outer shaft 30. The three shafts are closely interfitted but rotatable relative to one another and relative to top portion 26 of stand 2.

A globe 31 is suspended to inner shaft 28, which will hereinafter be referred to as the globe support shaft. Inner shaft 28 extends through top portion 26 and a bushing 32 which is secured to the top portion 26. A set screw 33 extends through bushing 32, and when it is so desired, set screw 33 can secure globe support shaft 28 to prevent it from rotating relative to upper portion 26. Globe support shaft 28 is pinned to a horizontally disposed disc 34 which carries a pair of matched scales 35 and 36 about its outer periphery. Since disc 34 is pinned to globe support shaft 28, there is no relative movement between scales 35 and 36 and globe 31; consequently, scales 35 and 36 indicate actual meridians on the globe.

The extension 37 of globe support shaft 28 on the upper side of top portion 26 carries a gear 38. A pinion 39 in mesh with gear 38 is carried by a shaft 40, which is secured to top portion 26 but rotatable relative to it. A knurled knob 41 is secured to shaft 40. When knob 41 is turned, the pinion 39 rotates and thus drives gear 38 which rotates globe support shaft 28.

Central shaft 29, hereinafter called present longitude shaft, is provided with an arm 42 that carries a pointer 43 that reads against scale 35 on disc 34. At its lower extremity, present longitude shaft 29 is in engagement with present meridian hoop 20. Hoop 20 is slidable in a slideway 44 positioned in a block 45 secured to present longitude shaft 29. A pointer 46 positioned on block 45 indicates the position of present meridian hoop 20 relative to the block. Present meridian hope 20 carries a scale 47 graduated to read latitude north and south of the equator. The scale reading at the mid-point of present meridian hoop 20 is zero, and this extends at the outermost extremities to 90 degrees north or south of the equator.

Outer shaft 30, hereinafter called destination longitude shaft, is provided with an arm 48 that carries a pointer 49 that reads against scale 36 on disc 34. The lower extermity of the destination longitude shaft is in engagement with destination median 23. Hoop 23 is slidable in a slideway 50, which is positioned in a block 51, secured to destination longitude shaft 30. A pointer 52 indicates the position of hoop 23 relative to destination longitude shaft 30. Hoop 23 carries a scale 53 which is similar to scale 47 on hoop 20 and reads longitude north and south of the equator. The mid-point of hoop 23 carries a zero mark which indicates the equator.

Destination longitude shaft 30 is further provided with a support 54 which carries a shaft 55 that is rotatable therein. A pinion 56 and a knurled knob 57 are secured to shaft 55. Pinion 56 is in engagement with a gear sector 58 cut on the outer periphery of hoop 23. By turning knurled knob 57, pinion 56 drives gear sector 58 to move hoop 23 relative to pointer 52 and destination longitude shaft 30.

In order to set this mechanism for any selected course, it is necessary to provide a structure for reading and setting the present longitude and latitude of the position of the ship and a structure for reading and setting the longitude and latitude of the destination of the ship. The structure provided for these readings and settings is as follows:

In order to set the present latitude, a gear sector 59 is secured to one of the supporting shafts 4. A pinion 60 in engagement with sector 59 is carried by a shaft 61 which is rotatably supported (not shown) by stand 2. A knurled knob 62 is secured to shaft 61, and when it is turned pinion 60 drives gear sector 59 to rotate supporting shafts 4 relative to stand 2. The rotation of shaft 4 is indicated by pointer 46 reading against scale 47, and the present latitude is thus set.

In order to set the present longitude, assuming that pins 21 on hoop 20 are in axial alignment with pins 7 of D-ring 1, disc 34 is rotated by means of knurled knob 41 rotating pinion 39 which drives gear 38 and globe support shaft 28. Since disc 34 is secured to globe support shaft 28, dial 35 is moved relative to pointer 43 until the predetermined setting is reached.

In order to set the latitude of destination, knurled knob 57 is rotated to turn pinion 56 which drives gear sector 58 moving hoop 23 relative to pointer 52 on block 51 until the predetermined setting is reached.

In order to set the longitude of destination, gear teeth 63 are provided on the outer periphery of outer ring 13. Support ring 5 carries an ear 64 which rotatably supports a shaft 65 on which there is mounted a pinion 66. A knurled knob 67 is secured to shaft 65 and when it is rotated, it turns pinion 66 which drives gear teeth 63 and turns outer ring 13 relative to support ring 5. As outer ring 13 is rotated, hoop 23 rotates with it and turns destination longitude shaft 30 about globe support shaft 28. As destination longitude shaft 30 rotates, arm 48 and pointer 49 move relative to scale 36 until the predetermined setting is reached.

In accordance with that which has heretofore been disclosed, D-ring 1 is pivotable with supporting shafts 4 relative to stand 2. Support ring 5 is pivotable with pins 7 relative to D-ring 1.

Present longitude ring 12, and destination longitude ring 13, are rotatable relative to one another and relative to support ring 5. This structure permits support ring 5, present longitude ring 12, and destination longitude ring 13 to describe a great circle course from a present position to a selected destination.

In order to have the three parallel rings 5, 12 and 13 describe the desired great circle course, it is necessary first to have all the set screws loosened, then pins 21 on present meridian hoop 20 are placed in axial alignment with pins 7 in D-ring 1. While it is not shown in the drawings, a releasable pin detent arrangement is provided to properly position present longitude ring 12 relative to support ring 5 in order to have pins 21 in axial alignment with pins 7.

Knurled knob 62 is turned to rotate shaft 4 relative to support 2, which raises or lowers pins 7 according to the direction of rotation of knob 62 and moves present meridian hoop 20 relative to present longitude shaft 29 and the present latitude is set in by aligning pointer 46 with scale 47 on hoop 20.

Since the starting point for any setting is always with pin 21 in axial alignment with pin 7, it is necessary to move globe support shaft 28 and globe 31 relative to present meridian 20 until the pointer 43 reads the proper degree of present longitude on scale 35. To do this, knurled knob 41 is turned to drive gear 38 and globe support shaft 28. Disc 34, which is pinned to globe support shaft 28, is turned with the shaft until the present meridian degree on scale 35 is aligned with pointer 43 on arm 42. To reiterate, for every present longitude setting, pointer 43 is in the same position and scale 35 must be moved relative to pointer 43. When the proper meridian degree on dial 35 is in alignment with pointer 43, the corresponding meridian on globe 31 is under present meridian hoop 20. Set screw 33 is then tightened and globe support shaft 28 is locked in place.

The destination latitude is then set by turning knurled knob 57 which drives pinion 56 and gear sector 58 until the selected latitude on scale 53 is in alignment with pointer 52 secured to destination latitude shaft 30. Pins 24 are thus raised or lowered, depending upon the preselected destination latitude.

Destination longitude hoop 23 is then moved until it corresponds with the meridian of destination. This is done by turning knurled knob 67 which drives pinion 66 and gear teeth 63. Pins 24 are, consequently, moved to the right or to the left and hoop 23, because of its contact with slideway 50 in block 51, rotates destination longitude shaft 30 and the arm 48 secured thereto. Knurled knob 67 is rotated until pointer 49 is in alignment with destination longitude on scale 36 on disc 34. When this setting is reached, destination meridian hoop 23 is over the meridian on the globe that passes through the destination point.

It should be pointed out at this time that globe 31 is not a functioning element of this mechanism. Its purpose is merely to visually interpret the settings that are made on the various scales. It is not intended that any accurate readings be obtained from globe 31, but it is obvious that the globe will be of assistance in telling whether the protracted course passes through any islands or other obstructions.

When these settings have been made, the three parallel rings 5, 12 and 13, describe the initial great circle course to be followed to reach the selected destination. The angle 72 between present meridian hoop 20 and present longitude ring 12 is the initial course angle for the great circle course to be followed. If the helmsman sets his steering apparatus at this angle, he starts along the great circle course to the destination. As will be hereinafter described, the course angle changes continually; consequently, the helmsman continually resets his course in agreement with this course angle.

In order to facilitate the reading of the course angle thus determined, a gear sector 68 is securled to present meridian hoop 20. This gear sector is rotatable with hoop 20 about pins 21 as an axis. Gear sector 68 is in engagement with a gear 69 secured to a shaft 70 of a selsyn generator 71, which, in turn, is secured to gear ring 15, integral part of present longitude ring 12. As gear 69 is driven, it changes the phase angle between the stator and the rotor of the selsyn generator 71, thus increasing or decreasing the voltage output of the generator, depending upon whether the phase angle is increased or decreased. When the plane of present meridian hoop 20 is at right angles to the plane of present longitude ring 12, the phase angle between the stator and rotor in generator 71 is zero and, consequently, a zero voltage is produced by the generator.

The voltage produced by generator 71 can be transmitted to an indicator in front of the helmsman, or it can be employed to operate automatic steering equipment within a ship.

As has been previously described, a bracket 18 is secured to support ring 5 and positions a motor 17 and a pinion 19 in engagement with gear teeth 16 on gear ring 15. As pinion 19 turns, it drives gear ring 15. Since gear ring 15 is fixed relative to present longitude ring 12, pins 21 positioned thereon and present meridian hoop 20 move with gear ring 15. Present meridian hoop 20, in turn, through its engagement with slideway 44 in block 45 rotates present longitude shaft 29. Arm 42 and pointer 43, which are secured to present longitude shaft, rotate relative to scale 35. When pinion 19, then, is rotated clockwise (viewed from motor 17), arm 42 and pointer 43 move across scale 35 towards arm 48 and pointer 49, which are secured to the destination longitude shaft 30. As arm 42 and pointer 43 move towards the destination point, present meridian hoop 20 moves towards destination meridian hoop 23 and the course angle 72 increases or decreases dependent on whether pins 21 move downwardly or upwardly towards pins 24. That is, if the course angle 72 as originally set, is less than 90 degrees, outer pin 21 is below pin 24 and as present meridian hoop 20 moves towards destination meridian hoop 23 the course angle gradually changes until it is in alignment when present meridian hoop 20 is directly under destination meridian hoop 23. Inversely, if outer pin 21 is above pins 24, then course angle 72 is greater than 90 degrees and as present meridian hoop 20 moves towards destination meridian hoop 23, the course angle gradually changes until it is in alignment when present meridian hoop 20 is directly under destination meridian hoop 23.

In order for this mechanism to be automatic, it is necessary to have present meridian ring 20 correspond with the present meridian of the ship at any instant; consequently, it is desirable to translate the distance traveled by the ship into a movement of present longitude ring 12. At present, the best method of determining distance traveled by a ship is through measurement of its propeller revolutions. Accordingly, a gear 73 is arranged to be driven by a propeller shaft 74. Gear 73 is secured to a shaft 75 of a generator 76. Suitable wiring is used to connect generator 76 to motor 17. With this arrangement, the rotation of propeller shaft 74 produces a voltage in generator 76 that is employed to drive motor 17 and pinion 19. Suitable gear reduction units (not shown) must be used between propeller shaft 74 and generator 76 in order to properly translate the revolutions of the propeller into the distance travelled by the ship and cause a corresponding movement of present longitude ring 12. With this structure, certain adjustable conditions, such as varying a resistance in the generator field, can be employed to compensate for wind drift and tides. With adjustable variables such as this, pin 21 can be made to closely follow the path of the ship; i. e. pin 21 gradually approaches pin 24 to describe on the globe the course followed by the ship.

Before the operation of this invention is described, a reference is made to Fig. 2 which gives a simpler indication of what takes place in the structure above described. In the structure in Fig. 1, in order to clearly indicate the operating parts, it was necessary to set a great circle course along the equator; consequently, course angle 72 for that particular setting would remain 90 degrees at all times. Fig. 2 which does not disclose an operating drawing shows the plane of rings 12 and 13 when the ship is to follow a great circle course from a point north of the equator westwardly across the equator to a point south of it. In Fig. 2, supporting shafts 4 are shown positioned in stand 2 and supporting D-ring 1. Pins 7 pass through D-ring 1 to pivotally support destination longitude ring 13. Present longitude ring 12 and destination longitude ring 13 are indicated to correspond with those shown in Fig. 1. Outer pin 21 and present meridian hoop 20 indicate the present position of the ship above the equator. Pin 24 indicates the destination of the ship while present longitude ring 12 and destination longitude ring 13 are parallel and the two of them describe the great circle course to be followed from pin 21 to pin 24. Course angle 72 is indicated between present meridian hoop 20 and present longitude ring 12. As pin 21 moves towards pin 24, course angle 72 gradually decreases until it is in alignment when present meridian hoop 20 is under destination meridian 24.

In the operation of this device referring again to Fig. 1, pins 21 are first aligned with pins 7. Then, a setting is made of the present position and of destination position as has been heretofore described. Proper setting gives a course angle 72 which is transmitted by selsyn generator 71 to the helmsman or to automatic steering equipment. As the propeller of the ship rotates, propeller shaft 74 drives gear 73 and generator 76 to produce a voltage that drives motor 17 and pinion 19. The rotation of pinion 19 drives present longitude ring 12 and present meridian hoop 20 and pin 21 follows a pre-selected great circle course to the destination.

In order to simplify the description of this invention, it was necessary to give a schematic indication of the functioning elements. Obviously, a careful machining and vernier scales are required for accurate settings, but there is no reason why these parts cannot be built by a skilled machinist.

This invention is primarily a great circle course computer and, as such, is a great time saver in that it indicates a great circle course angle to be followed to a destination without mathematical calculations. With automatic operation of this invention, the course angle is continually indicated. Without automatic operation, the course angle to be followed is indicated each time the computing device is reset after a "fix" has been made to determine the present position of the ship.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. A great circle course computing instrument comprising a present latitude ring, a present longitude hoop, a destination latitude ring, a destination longitude hoop, means including a pivot point for pivotally supporting said present longitude hoop on said present latitude ring, means including a pivot point for pivotally supporting said destination longitude hoop on said destination latitude ring, means for supporting said rings in the same plane, means mounting said rings for movement relative to one another in said plane, a globe simulating the earth and mounted within said rings for rotation about an axis representing the earth's polar axis, a shaft disposed in alignment with said axis, said hoops intersecting at said shaft, means for guiding said hoops at said shaft, means mounting said hoops for rotation about said shaft, means for adjusting said hoops to vary the displacement of said pivot points from said shaft, means including scales for adjusting the present latitude ring and present longitude hoop to have the pivotal point connecting them represent a present position on the earth's surface, means including scales for adjusting the destination latitude ring and destination longitude hoop to have the pivotal point connecting them represent a destination position on the earth's surface, and means for measuring the angle between said present longitude hoop and the plane of said rings, said angle being the great circle course angle to be followed from the present position to the destination position.

2. A great circle course computing instrument comprising a present latitude ring, a present longitude hoop, a destination latitude ring, a destination longitude hoop, means including a pivot point for pivotally supporting said present longitude hoop on said present latitude ring, means including a pivot point for pivotally supporting said destination longitude hoop on said destination latitude ring, pivotal means supporting said rings in the same plane for rotation about a diameter thereof, means mounting said rings for movement relative to one another in said plane, a fixed shaft representing the earth's polar axis, said hoops intersecting at said shaft, means for guiding said hoops at said shaft, means mounting said hoops for rotation about said shaft, means for adjusting said hoops to vary the displacement of said pivot points from said shaft, means including scales for adjusting the present latitude ring and present longitude hoop to have the pivotal point connecting them represent a present position on the earth's surface, means including scales for adjusting the destination latitude ring and destination longitude hoop to have the pivotal point connecting them represent a destination position on the earth's surface, and means fixed to and movable with said present longitude hoop for measuring the angle between said present longitude hoop and the plane of said rings, said angle being the great circle course angle to be followed from the present position to the destination position.

3. A great circle course computing instrument comprising a present latitude ring, a present longitude hoop, a destination latitude ring, a destination longitude hoop, means including a pivot point for pivotally supporting said present longitude hoop on said present latitude ring, means including a pivot point for pivotally supporting said destination longitude hoop on said destination latitude ring, means for supporting said rings in the same plane, means mounting said rings for movement relative to one another in said plane, a globe simulating the earth and mounted within said rings for rotation about an axis representing the earth's polar axis, a shaft disposed in alignment with said axis, said hoops intersecting at said shaft, means for guiding said hoops at said shaft, means mounting said hoops for rotation about said shaft, means for adjusting said hoops to vary the displacement of said pivot points from said shaft, means including scales for adjusting the present latitude ring and present longitude hoop to have the pivotal point connecting them represent a present position on the earth's surface, means including scales for adjusting the destination latitude ring and destination longitude hoop to have the pivotal point connecting them represent a destination position on the earth's surface, and means fixed to and movable with said present longitude hoop for measuring the angle between said present longitude hoop and the plane of said rings, said angle being the great circle course angle to be followed from the present position to the destination position.

FRANK E. VALENTINE.

REFERENCES CITED

The following references are of record in the file of this patent:

UNITED STATES PATENTS

| Number | Name | Date |
|---|---|---|
| 1,895,606 | Burns | Jan. 31, 1933 |
| 1,930,945 | Sjostrand | Oct. 17, 1933 |
| 2,022,275 | Davis | Nov. 26, 1935 |
| 2,108,260 | Harris | Feb. 15, 1938 |
| 2,302,210 | Graves | Nov. 17, 1942 |
| 2,368,691 | Vielehr et al. | Feb. 6, 1945 |